Dec. 16, 1969  TADASHI SUGINO ET AL  3,484,056
MOTION PICTURE FILM MAGAZINE
Filed May 3, 1968  2 Sheets-Sheet 1
FIG. 1
(PRIOR ART)
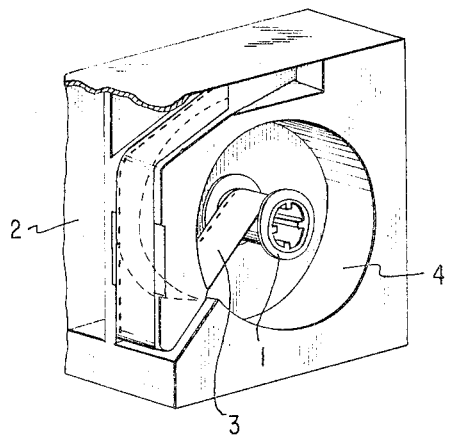
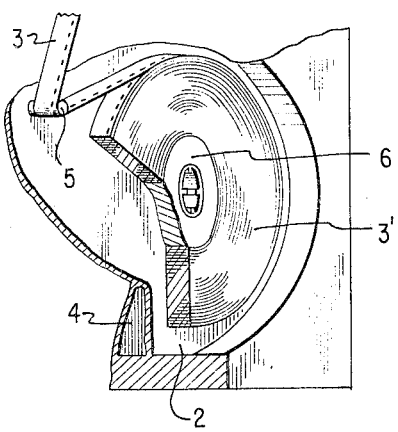
FIG. 2
INVENTORS,
TADASHI SUGINO
KEIJI KANEKO
BY *Sughrue, Rothwell, Mion, Zinn & Macpeak*
ATTORNEYS.

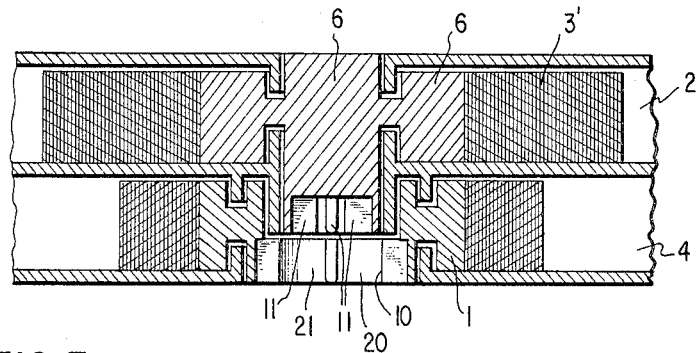
FIG. 3
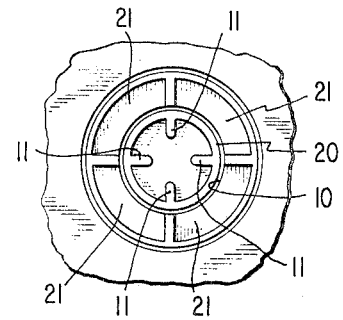
FIG. 4
FIG. 5
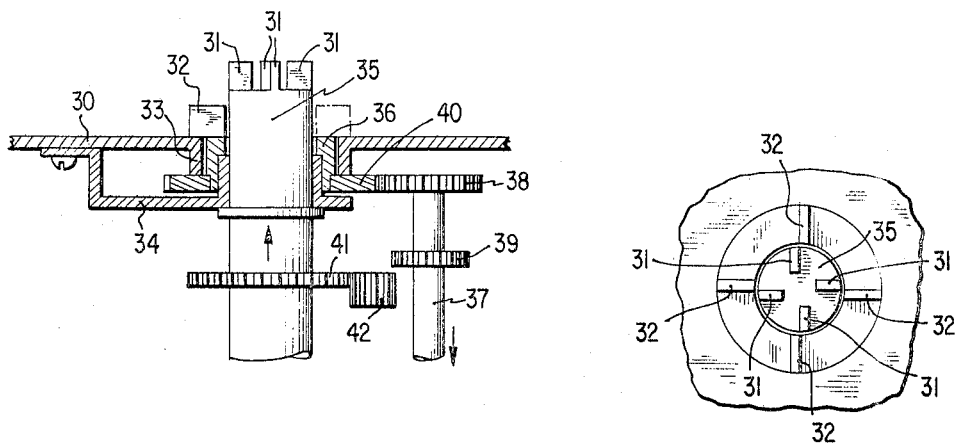
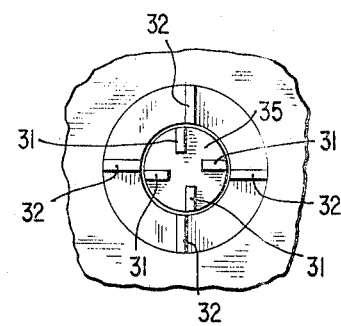
FIG. 6
INVENTORS.
TADASHI SUGINO
KEIJI KANEKO
BY *Sughrue, Rothwell, Mion, Zinn & Macpeak*
ATTORNEYS.

United States Patent Office 3,484,056
Patented Dec. 16, 1969

3,484,056
MOTION PICTURE FILM MAGAZINE
Tadashi Sugino, Minami-Ashigara, and Keiji Kaneko, Ashigara-Kamigun, Japan, assignors to Fuji Shashin Film Kabushiki Kaisha, Minami-Ashigara Machi, Ashigara-Kamigun, Kanagawa, Japan
Filed May 3, 1968, Ser. No. 726,447
Claims priority, application Japan, May 24, 1967, 42/43,680
Int. Cl. G11b 15/32
U.S. Cl. 242—193                                        1 Claim

ABSTRACT OF THE DISCLOSURE

A motion picture film magazine having a film take-up chamber and a film supply chamber disposed in coaxial relationship carrying respectively, as a film take-up core and a film wind-back core, with the cores, provided on their ends, with projections for engagement with the driving means of the camera.

BACKGROUND OF THE INVENTION

This invention relates to a motion picture film magazine, and more particularly to a motion picture film magazine having a film supply chamber and a take-up chamber.

In motion picture photography, it is sometimes desirable to take overlapped pictures, often with the fade-in and fade-out technique. In the conventional film magazine of the type having a supply chamber and a take-up chamber disposed in coaxial relationship, a take-up core is disposed in the take-up chamber, but there is no core in the film supply chamber. Therefore, the filmstrip wound on the take-up core cannot be wound back into the film supply chamber.

SUMMARY OF THE INVENTION

This invention provides a motion picture film magazine which makes it possible to take overlapped motion pictures. For this purpose, this film magazine is provided with a film wind-back core to facilitate rewinding of the filmstrip taken up by the film take-up chamber.

An object of this invention is to provide a motion picture film magazine having a wind-back core in the film supply chamber for making it possible to wind back the film taken up in the take-up chamber.

Another object of this invention is to provide a motion picture film magazine in which the wind-back core is disposed coaxial with the take-up core and is able to be driven from the same side of the magazine as the take-up core.

BRIEF DESCRIPTION OF THE DRAWING

FIG. 1 is a perspective view, partly in section, of a conventional motion picture film magazine, FIG. 2 is a perspective view, partially in section, of the film supply chamber loaded with a film of a film magazine manufactured in accordance with the present invention, FIG. 3 is a sectional view of the main part of a film magazine in accordance with this invention, FIG. 4 is a bottom plan view of the core portion of the film magazine shown in FIG. 3, FIG. 5 is a sectional, side view of the cinecamera driving means for driving the cores of the film magazine of this invention, and FIG. 6 is a top plan view of the driving shaft of the driving means shown in FIG. 5.

DETAILED DESCRIPTION OF THE PREFERRED EMBODIMENT

Referring now to the drawings, as shown in both FIGS. 1 and 2, a filmstrip 3 is drawn out tangentially from the film roll 3' contained in the film supply chamber 2 of a film magazine and taken-up on take-up core 1 in take-up chamber 4 through a path about a rotatable snubber 5 disposed at the corner of the film magazine.

In the film magazine in accordance with this invention, the core hub 6' of the wind-back core 6 extends axially into film take-up chamber 4' as shown in FIGS. 2, 3 and 4. On the end of the core hub 6' a plurality of projections 11 are arranged to be rotated by projections 31 disposed on the end of the wind-back driving core 35 (shown in FIGS. 5 and 6) of the camera. The wind-back driving core 35 of the camera is inserted into the film magazine from the bottom side, as in FIG. 3, so that the projections 31, disposed on the end of the driving core 35, are engaged with the projections 11 on the end of the wind-back core 6' and the wind-back core 6 is rotated thereby. In the film take-up chamber 4, a take-up core 1 for taking-up the filmstrip 3 into convolutions 3' is rotatably disposed, coaxially with the wind-back core 6. The take-up core 1 is formed with a central opening 20 of a size allowing the means for operating the projections 11 on the end of the wind-back core 6, to be inserted thereinto. On the internal periphery 10 of the central opening 20, a plurality of recesses 21. The take-up core 1 is rotated by take-up driving core 36 which is coaxially mounted relative to the wind-back driving core 35 of the camera. Thus both the take-up core 1 and the wind-back core 6 are rotated by camera driving means through engagement of core projections with the projections of camera driving means.

As the motion picture film magazine in accordance with this invention is constructed as described above, the filmstrip in the magazine is easily taken-up and wound-back by a simple mechanism carried by the cinecamera or the projector.

The driving means for driving the take-up core and the wind-back core in the film magazine may comprise various mechanisms. One embodiment of the driving mechanism for a cinecamera or projector is described hereinbelow.

FIGS. 5 and 6 show in sectional and top plan view, one driving mechanism in a cinecamera.

Referring to FIG. 5, the side wall 30 of the magazine compartment of the cinecamera is provided with a circular opening 33 receiving and loosely holding the driving core 36 of the camera. The side wall 30 has, on the back side thereof, a holding plate 34 which rotatably holds the wind-back driving core 35 of the camera. The wind-back driving core 35 includes a plurality of projections 31, for engagement with projections 11 on the end of the wind-back core 6 of the film magazine. It is movable up and down for selective engagement with the wind-back core 6 in the film magazine. When it is in the upper position thereof, it will be in engagement with the wind-back core 6 and when it is moved down, it disengages. Between the wind-back driving core 35 and the internal surface of the circular opening 33, a cylindrical take-up driving core 36 is provided, having a plurality of projections 32 to engage with recesses 21 of the take-up core 1 of the magazine. It is rotatably mounted, such that take-up core 1 is rotated during rotation thereof and the filmstrip 3 in the film magazine is taken-up. Both the wind-back driving core 35 and the take-up driving core 36 are rotated by conventional gear mechanism. One such gear mechanism is shown in FIGS. 5 and 6. In the embodiment shown, the driving cores are driven by a gear mechanism comprising an axially movable gear shaft 37, rotated in one direction by a driving source such as a motor. A couple of gears 38, 39 are fixed to the gear shaft 37, a gear 40 is fixed to the take-up driving core 36 and is engaged with gear 38. An intermediate gear 42 is engaged with gear 41 which is fixed to the wind-back driving core 35 and is brought into engagement with gear 39 by axial movement of the gear shaft 37. During take-up, the wind-back driving core 35 is moved axially in the opposite direction to the arrow of FIG. 5, to disengage projections 31 of the wind-back driving core 35 from the projections 11 of the wind-back core 6 in the film magazine. Gear shaft 37 is moved to the position shown in FIG. 5 to set free the wind-back driving core 35 by disengaging gear 39 of gear shaft 37 from intermediate gear 42. Gear 38 is engaged with the gear 40 to rotate the cylindrical take-up driving core 36 in the opposite direction to that of the gear shaft 37, whereby, the take-up core 1 of the film magazine is rotated by engagement of projections 32 of the take-up driving core 36 with the recesses 21 of the take-up core 1. In case of rewinding, the wind-back driving core 35 is moved axially in the direction of the arrow, FIG. 5 and set in the position shown in FIG. 5. The projections 31 of the wind-back driving core 35 engage the projections 11 of the wind-back core 6 in the film magazine. The gear shaft 37 is moved axially in the direction of the arrow to free the take-up driving core 36 by disengaging the gear 38 from the gear 40 of the take-up driving core 36. Gear 39 of gear shaft 37 engages with intermediate gear 42, whereby the wind-back core 6 of the film magazine is rotated by the wind-back driving core 35.

The wind-back core 6 may not necessarily extend into the take-up chamber 4 of the film magazine if the wind-back driving core 35 is lengthened. Also, instead of recess 10, a central opening may be provided similar to opening 20 in the take-up core 1.

The invention has been described in detail with particular reference to an embodiment thereof, but it will be understood that variations and modifications can be effected within the spirit and scope of the invention as described hereinabove and as defined in the appended claim.

What is claimed is:

1. In a motion picture film magazine having a film supply chamber and a film pick up chamber, a film pick up core disposed in said film pick up chamber and coaxial with a film wind-back core carried by the film supply chamber, the improvement wherein: the film pick up core is cylindrical in configuration to expose the adjacent lateral surface of the wind-back core, and said magazine further includes: first drive shaft coupling means carried on said exposed film wind-back core lateral surface, and second drive shaft coupling means carried by said cylindrical film pick up core concentric therewith, with said first drive shaft coupling means comprising a cylindrical projection carried by said film wind-back core, extending axially therefrom and interiorly of said cylindrical film take-up core, with said cylindrical projection including a purality of spaced, inwardly extending projections on the inner surface thereof, whereby: a cinematographic apparatus drive means may be selectively coupled to either said first or second drive shaft coupling means.

References Cited
UNITED STATES PATENTS 1,525,990   2/1925   Howell _____ 242—55.11 X LEONARD D. CHRISTIAN, Primary Examiner U.S. Cl. X.R.

242—200; 352—78